United States Patent [19]

Harris et al.

[11] Patent Number: 4,752,847
[45] Date of Patent: Jun. 21, 1988

[54] STORAGE DISK DRIVE MECHANISM

[75] Inventors: Clark E. Harris, Fairport; Roger G. Covington, Rochester, both of N.Y.

[73] Assignee: Eastman Kodak Company, Rochester, N.Y.

[21] Appl. No.: 799,512

[22] Filed: Nov. 19, 1985

[51] Int. Cl.⁴ ............................................. G11B 5/012
[52] U.S. Cl. ..................................... 360/97; 360/133
[58] Field of Search ................................. 360/98–99, 360/133, 97; 369/270–271

[56] References Cited

U.S. PATENT DOCUMENTS

| 2,286,015 | 6/1942 | Schneider | 369/270 |
| 4,149,207 | 4/1979 | Porter et al. | 360/133 |
| 4,445,155 | 4/1984 | Takahashi et al. | 360/99 |
| 4,466,031 | 8/1984 | Mursoka | 360/97 |
| 4,669,008 | 5/1987 | Ichihara | 360/133 X |

FOREIGN PATENT DOCUMENTS

| 57-212673 | 12/1982 | Japan | 369/270 |
| 58-130480 | 8/1983 | Japan . | |
| 59-54089 | 3/1984 | Japan | 369/270 |
| 59-058677 | 4/1984 | Japan . | |
| 59-087677 | 5/1984 | Japan . | |
| 96495 | 10/1922 | Switzerland . | |

2146483  4/1985  United Kingdom .

OTHER PUBLICATIONS

Research Disclosure No. 25024, p. 109, vol. 250, Feb. 1985, *Research Disclosure*, Kenneth Mason Publications Ltd., Hampshire, England.

*Primary Examiner*—A. J. Heinz
*Attorney, Agent, or Firm*—William C. Dixon

[57] ABSTRACT

A storage disk drive mechanism is disclosed for rotatably driving a storage disk comprising a flexible circular information recording medium attached to a hub member. The hub member is of the type having an enlarged central positioning aperture and a radially spaced drive aperture. The drive mechanism comprises a rotatable clutch plate having an axial positioning pin for receiving the positioning aperture of the hub member when a disk assembly containing the storage disk is mounted thereon. The clutch plate further has a spring member mounted thereon having a smooth uninterrupted laterally extending beveled claw extending into the driving aperture. Upon rotation of the clutch plate, the claw drivingly engages a driven surface defined by the driving aperture for centering, retaining and driving the storage disk.

6 Claims, 2 Drawing Sheets

STORAGE DISK DRIVE MECHANISM

BACKGROUND OF THE INVENTION

1. Field of the Invention

This invention relates generally to storage disk apparatus, and more specifically to an improved storage disk drive mechanism.

2. Description of the Prior Art

A flexible magnetic disk cassette enclosing a storage disk which is driven by a drive mechanism is disclosed in U.S. Pat. No. 4,445,155 to Takahashi et al. which issued on Apr. 24, 1984. With reference to FIGS. 3 and 5 of Takahashi et al., a disk 21 is mounted on a hub member 23 having an enlarged positionng aperture 24 and a radially spaced driving aperture 25. The positioning aperture has abutment surfaces 24a, 24b defining a V, and the bisector thereof is parallel to a driving edge 25b of the driving aperture. The drive mechanism, shown best in FIGS. 13 and 18-21, has a clutch plate 90 onto which a spring member 86 is mounted. A drive pin 85 on spring member 86 is movable through an opening 89 in clutch plate 90 into driving aperture 25. The pin 85 engages positioning edge 25a for imparting radial movement to hub member 23 causing shoulders 24a, 24b to engage positioning shaft 83b for centering the disk. Pin 85 further engages a separate driving edge 25b for imparting rotation to storage disk 21.

Research Disclosure No. 25024 which was published on February, 1985 discloses a storage disk 10 mounted on a hub member 12. The hub member has a central hole 14 having a notch 16 providing two bearing surfaces for engaging spindle 18 for centering the disk. A bisector of the two bearing surfaces is transverse to a driving edge of a beveled lug 26. The drive mechanism has a radially extending drive pin 24, 36, 48 for drivingly engaging lug 26 to draw hub 12 downwardly until pads 20 on the hub are seated on a locating surface 22 of the drive mechanism.

A storage disk and drive mechanism is also disclosed in U.S. Pat. No. 4,466,031 to Muraoka which issued on Aug. 14, 1984.

SUMMARY OF THE INVENTION

In accordance with a preferred embodiment of the invention, a storage disk drive mechanism is disclosed for rotatably driving a storage disk of the type comprising a circular information recording medium attached to a circular plate-like hub member. The hub member has a central positioning or centering aperture and a radially spaced drive aperture defining a driven surface. The storage disk drive mechanism comprises a rotatably mounted clutch plate member having a base surface and a radially spaced opening extending through the clutch plate parallel to the axis. Drive means are coupled to the clutch plate for imparting rotation thereto. A spring member is mounted on the base surface of the clutch plate and has an integral part thereof forming a smoothly uninterrupted laterally and vertically extending beveled claw which extends through the opening. The claw has a beveled leading edge surface for drivingly engaging the driven surface on the hub member for centering, retaining and driving the storage disk.

In a more specific aspect of the invention, the claw is formed of a thin flat material of rectangular cross section. The claw further has a tongue at its free end which extends laterally in a direction opposite to the direction of rotation of the clutch plate.

A primary advantage of this invention is to provide an improved storage disk drive mechanism that is of simple design and construction, thoroughly reliable and efficient in operation, and economical to manufacture.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
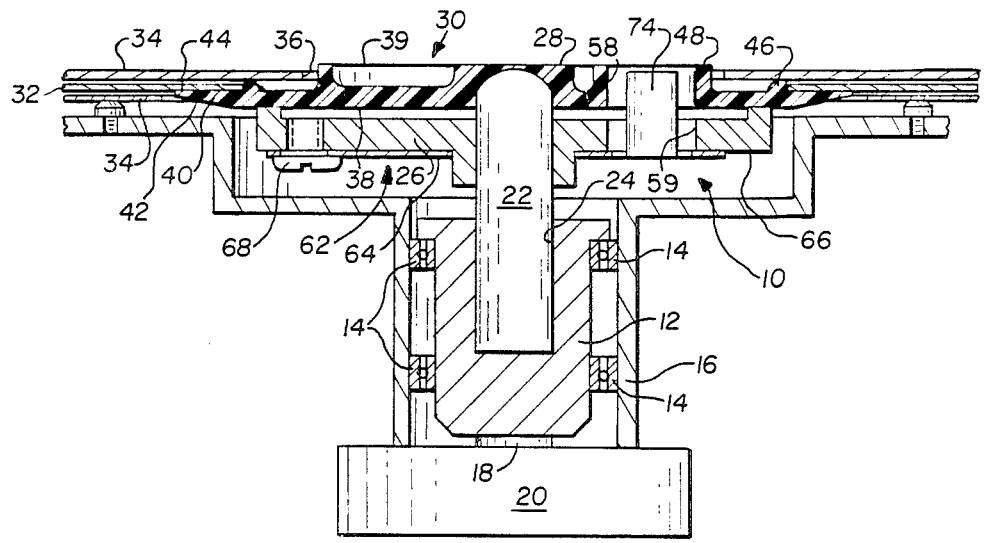
FIG. 1 is a side elevational view in section of a preferred embodiment of the storage disk drive mechanism of this invention.
Figure 2:
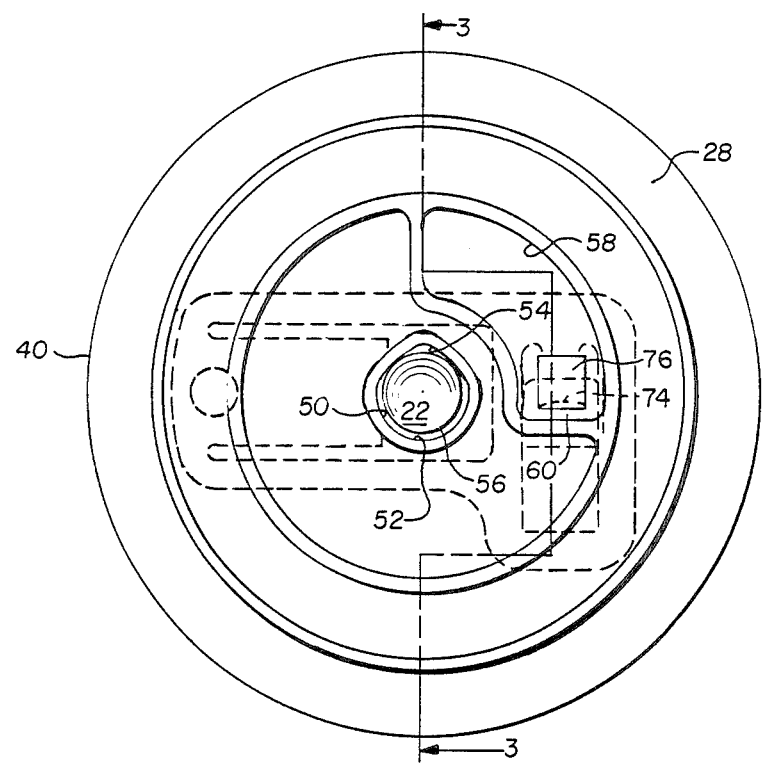
FIG. 2 is a top plan view of the storage disk drive mechanism of FIG. 1 with the storage disk and jacket omitted for purposes of clarity.
Figure 3:
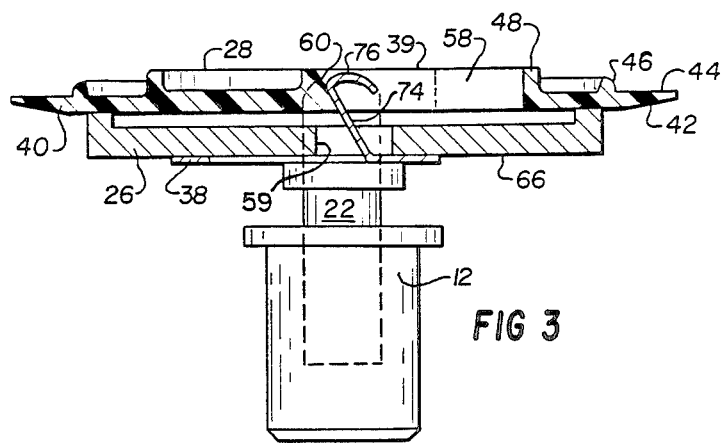
FIG. 3 is a section view taken substantially along line 3—3 of FIG. 2.

Referring now to FIGS. 1-3 of the drawings, a preferred embodiment of the storage disk drive mechanism 10 of this invention is shown. The drive mechanism 10 is incorporated in a known type of recording and/or reproducing apparatus, not shown, for handling flexible or floppy magnetic disk assemblies, jackets cassettes or the like. Since the recording and/or reproducing apparatus per se does not form a part of this invention, only a portion of the mechanism thereof that supports the drive mechanism is shown.

The drive mechanism 10 comprises a cylindrical bearing shaft 12 mounted for rotation on roller bearings 14 interposed between shaft 12 and a fixed frame 16 on the recording and/or reproducing apparatus. The bearing shaft 12 is coupled directly or through any suitable drive coupling, not shown, to a motor shaft 18 of any suitable drive motor 20. An upstanding positioning spindle 22 is press fit into an axial bore 24 of bearing shaft 12.

A flat circular clutch plate 26 is secured by any suitable means, not shown, to spindle 22 for supporting a novel hub member 28 of a conventional storage disk 30 when the storage disk is mounted thereon. The storage disk 30 is preferably mounted on hub member 28 by any suitable conventional means, not shown, incorporated in the recording and/or reproducing apparatus. The storage disk 30 comprises a circular disk-like information recording medium 32 which is attached by any suitable means to hub member 28. The recording medium 32 is preferably loosely enclosed within a flexible paper jacket 34 or cartridge, shown only in part in FIG. 1, having a central opening 36 surrounding hub member 28.

The hub member 28 is preferably a flat circular plastic molded part having a flat smooth base surface 38, an upper irregular surface 39, and a peripheral rim 40. A lower annular surface 42 of the rim is slanted and one edge thereof merges with base surface 38. An upper annular surface 44 of rim 40 is flat and parallel to base surface 38 and one edge thereof merges with annular surface 42 at the periphery of rim 40 and the opposite edge thereof merges with a ring 46. A center opening in recording medium 32 fits over ring 46 and a portion of the recording medium surrounding the opening is secured to upper annular surface 44 by any suitable means to form storage disk 30 in which the axes of hub member 28 and recording medium 32 are concentric.

Hub member 28 further has another ring 48 on its upper surface 39 that fits in central opening 36 in jacket 34. The jacket is of a conventional type for enclosing a storage disk 30 to protect it from physical damage, dust, fingerprints and other contaminents. The ring 48 cooperates with the inner peripheray of opening 36 to limit the free movement of the storage disk and to thereby place the axis of the storage disk substantially in alignment with the axis of spindle 22 when jacket 34 or a jacket enclosed in a cassette is mounted by the recording and/or reproducing apparatus on clutch plate 26.

As best seen in FIG. 2, a central aperture 50 extends through hub member 28 having a semi-cylindrical surface 52 of a radius larger than the radius of drive spindle 22 received thereby. The remainder of aperture 50 defines a V-shaped abutment surface 54 that merges with semi-cylindrical surface 52. When the hub member 28 is positioned with V-shaped abutment surface 54 in engagement with drive spindle 22, the spindle axis and axis of hub member 28 are coaxial. A space 56 between spindle 22 and semi-cylindrical abutment surface 52 allows some relative movement therebetween to accommodate existing play between storage disk 30 and jacket 34 when the jacket is mounted on spindle 22.

A drive aperture 58 also extends through the hub member 28 parallel to and radially spaced from the axis thereof. The drive aperture 58 is of arcuate shape extending through an angle of about 90°. A leading driven edge 60 of the drive aperture extends substantially in a radial direction and is substantially at right angles to a bisector of V-shaped abutment surface 54. The driven edge 60 is beveled, as best seen in FIG. 3, and extends from base surface 38 of hub member 28 to its upper surface 39.

Figure 4:
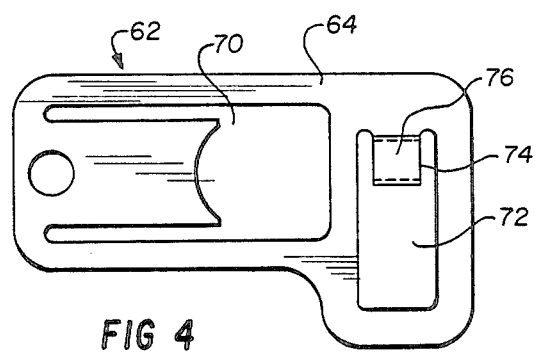
FIG. 4 is a top plan view of the drive spring of the storage drive mechanism of FIG. 1.

With reference to FIGS. 1-4, a drive spring 62 is disclosed having a flat portion 64 secured at one end to a base surface 66 of clutch plate 26 by a screw 68. The flat portion 64, as best seen in FIG. 4, has a first cut-out section 70 to accommodate spindle 22 extending therethrough and to give spring 62 the desired resilience. Flat portion 64 further has a second cut-out 72 portion to form an upturned, beveled claw 74 forming an angle of approximately 60° relative to flat portion 64 (FIG. 3). The claw 74 is radially spaced from the axis of hub member 28 substantially the same distance as drive aperture 58, and extends therein through opening 59 in clutch plate 26 (FIG. 3) for drivingly engaging beveled driven edge 60. The claw 74 is further provided with a laterally extending tongue 76 which is engageable by base surface 38 of hub member 28 when a jacket 34 containing a storage disk 30 is placed on clutch plate 26 without drive aperture 58 in register with claw 74.

Figure 5:
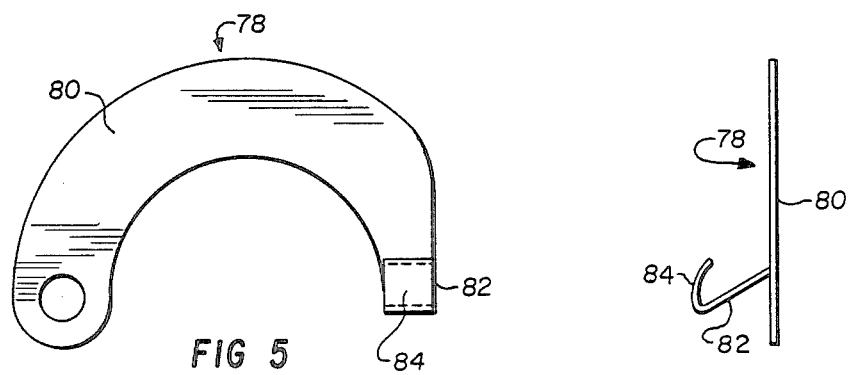
FIG. 5 is a top plan view of another embodiment of the drive spring of this invention.
Figure 6:
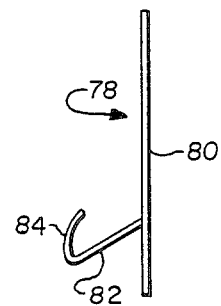
FIG. 6 is a side elevational view of the drive spring of FIG. 5.

With reference to FIGS. 5 and 6, another embodiment of a drive spring 78 is disclosed comprising an arcuate flat portion 80 having one end thereof adapted to be secured to base surface 66 of clutch plate 26. The opposite end of flat portion 80 is upturned to form a claw 82 and tongue 84 substantially identical to claw 74 and tongue 76 respectively.

In the operation of this invention, a cassette or jacket 34 in which a storage disk 30 is enclosed is placed on clutch plate 26 by conventional recording device means, not shown. The base surface 38 of hub member 28 engages tongue 76 in those instances in which drive aperture 58 is out of register with claw 74 and depresses drive spring 62 by virtue of its weight. Upon actuation of drive motor 20, initial rotation of spring 62 and clutch plate 26 causes the tongue 76 to spring into drive aperture 58 when the two are in register with one another, and beveled claw 74 to drivingly engage complementary beveled driven edge 60 of drive aperture 58. Torque applied to driven edge 60 causes abutment surface 54 of hub member 28 to engage spindle 22 for centering storage disk 30 so that its axis is coaxial with the spindle axis.

The invention has been described in detail with particular reference to preferred embodiments thereof, but it will be understood that variations and modifications can be effected within the spirit and scope of the invention.

What is claimed is:

1. In a storage disk drive mechanism for rotatably driving a storage disk comprising a circular information recording medium attached to a circular plate-like hub member, the hub member having a central positioning aperture and a radially spaced drive aperture defining a driven surface, the combination comprising:

a clutch plate member rotatable about an axis, said clutch plate member having an axially extending spindle for receiving the positioning aperture of the hub member when the storage disk is mounted thereon, said clutch plate member further having a lower base side, an upper side and a radially spaced opening extending through said clutch plate member parallel to said axis:

drive means coupled to said clutch plate member for imparting rotation thereto in one direction; and a spring member mounted on said base side of said clutch plate member, said spring member having a smooth uninterrupted laterally extending beveled claw in the form of a thin flat material which extends through said opening and above said upper side of said clutch plate member, said claw further having a beveled leading edge surface for engaging the driven surface on the hub member and driving it in said one direction for centering, retaining and driving the storage disk.

2. A storage disk drive mechanism according to claim 1 wherein the hub member has a lower base surface and an upper surface, and the driven surface on the hub member is a beveled surface extending from the base surface to the upper surface which is complementary to said beveled leading edge surface of said claw.

3. A storage disk drive mechanism according to claim 2 wherein said clutch plate member has datum surfaces on said upper side whereby upon rotation of said clutch plate member, said beveled leading edge surface of said claw engages the corresponding beveled driven surface on the hub member for simultaneously centering the storage disk, pressing the hub member against said datum surfaces and rotating the storage disk.

4. A storage disk drive mechanism according to claim 3 wherein the beveled driven surface is on the leading edge of the driven aperture in said one direction of rotation of the clutch plate and hub member.

5. A storage disk drive mechanism according to claim 4 wherein said claw and the drive aperture are both radially spaced from said axis of said clutch plate member substantially the same distance when the storage disk is mounted on said clutch plate, said claw further having a tongue at its free end which extends laterally in a direction opposite to said one direction of rotation of said clutch plate, and which is engaged and depressed by the base surface of the hub member when the storage disk is mounted on said clutch plate, said claw springing into the hub member drive aperture and engaging the bevelled driven surface thereof upon further rotation of said clutch plate in said one direction.

6. A storage disk drive mechanism according to claim 5 wherein the positioning aperture is enlarged relative to said spindle and extends from the base surface to the upper surface and has a center adapted to be slightly offset from the axis of the hub member, the positioning aperture further being defined by a semi-cylindrical surface and a merging V-shaped abutment surface adapted to engage said spindle for aligning the center of the hub member with the axis of said spindle, and the leading driven edge of the drive aperture extends substantially radially in a direction transverse to the bisector of the V-shaped abutment surface.

* * * * *